Figure 1:
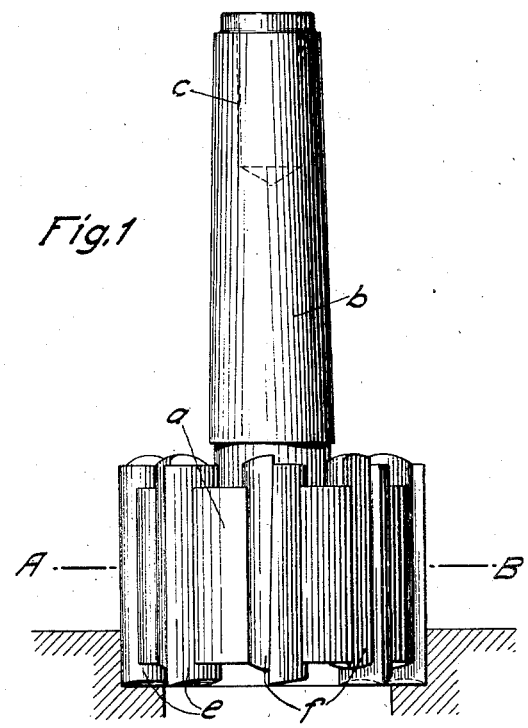

Feb. 27, 1934. A. BUCHMÜLLER 1,948,648

MILLING CUTTER

Filed Aug. 8, 1929

Inventor,
Alfred Buchmüller
By Henry Ooth Jr
Atty

Patented Feb. 27, 1934

1,948,648

UNITED STATES PATENT OFFICE 1,948,648

MILLING CUTTER

Alfred Buchmüller, Conz, near Trier, Germany, assignor of forty percent to Peter Zettelmeyer, Conz, twenty percent to Mrs. M. Weber, twenty percent to Mrs. Dr. E. Bichler, both of Trier, and twenty percent to Mrs. Dr. H. Corsten, Berlin-Lichterfeld, Germany Application August 8, 1929, Serial No. 384,302
In Germany August 18, 1928

8 Claims. (Cl. 29—105)

This invention relates to milling cutter heads with interchangeable loose cutters or teeth, as are commonly used in the working of metals for producing grooves, surfaces, slots, and elongated holes. It has for its object to provide a simple means for chucking the cutters so as to allow of easy adjustment in an axial and radial direction.

Milling or cutter heads are known in which the cutters are clamped in grooves in a carrier member by driving wedge shaped pins into elongated slots which are cut in the carrier member between the grooves for the cutters. Milling cutter heads have also been constructed in the form of hollow cylinders, the walls of which are provided with elongated slots in which the cutters are clamped by screws. There are also milling cutters in which the cutters inserted therein are clamped in position by pushing two wedge sleeves towards each other.

All these constructions, owing to the numerous separate parts and the difficulty of adjusting them, have the disadvantage of being complicated and expensive to make. In addition to this the milling cutter head is itself greatly weakened by the boring out, slotting, and other operations. In consequence, in the case of cutters of small thicknesses (those of 100 millimetres in diameter and less) it is difficult to construct a cutter which can permanently withstand severe strains, and yet ensure at the same time ready interchanging and positioning of the loose cutters.

The present invention provides a milling or cutter head with a substantially cylindrical main body the centre of which is solid and whose external surface contains axial grooves for the insertion of the cutters, each cutting tool being held in position by a wedge which is inserted in the groove, so that the edges of the groove grip firmly round the tool and its wedge, an edge of the tool projecting from the body of the head to form a cutting edge.

In one form of construction according to the present invention half-round cutting tools are inserted with their flat side bearing against the flat of half-round holding pins or wedges in correspondingly shaped grooves in the main body. The holding pins are for this purpose so rounded or bevelled off that they do not project from the external surface of the body of the milling cutter. The flats of the cutting tools and holding pins are made with a slight taper, thus providing a rigid chucking of the parts. By loosening the holding pins the loose cutters can be moved axially to any desired amount as wear of the metal takes place. Furthermore the cutting tools can also be adjusted radially to any desired breast and cutting angle according to the metal to be treated; in the case of solid milling cutters, where the teeth and the body of the milling cutter consist of the same material only one kind of metal can be worked upon. With the present milling cutter the large gaps between the teeth caused by the insertion of the cutting tools ensure the shavings getting away without friction. In consequence, the milling cutter does not heat up so much as a solid milling cutter, since the latter has to do much work by cutting and grinding up the shavings, the friction thereby generated being converted into heat. As experience has shown, a solid milling cutter is rendered useless, after a certain period of use, in consequence of flaws due to hardening and letting down of the hardness of the cutting. The present milling cutter, however, in consequence of the interchangeability and adjustability of its tools or teeth, has a considerably longer length of life notwithstanding its wide range of use.

Experience has shown that the present milling cutter gives very satisfactory results in practice. For example, with a milling cutter of 95 millimeters in diameter taking a cut of from 8 to 9 millimeters in machine steel of 55 to 60 kilogrammes per square centimeter strength, a cutting speed of 25 meters per minute and a feed speed of 52 millimeters per minute was obtained. Milling experiments on a Reinecker vertical milling machine with a milling cutter of 60 millimeters for the production of a cut of from 3 to 4 millimeters in machine steel of 55 to 60 kg. per square centimeter strength gave a cutting speed of 22 meters per minute and a feed of 116 millimeters per minute. With a depth of cut of 4 millimeters in bearing bronze a cutting speed of 22 meters per minute and feed of 158 millimeters per minute was obtained.

With a milling cutter 95 millimeters in diameter a total surface of 11600 millimeters with a cut of from 4 to 8 millimeters and a cutting speed of 18 meters and a feed of 80 millimeters per minute was obtained on cast iron. In this case it is particularly worthy of notice that the hard crust of 360 small castings chucked in succession were operated upon without the teeth having to be in any way reground.

One form of milling cutter according to the present invention is illustrated in the accompanying drawing, in which Figure 1 is an elevation.

Figure 2:
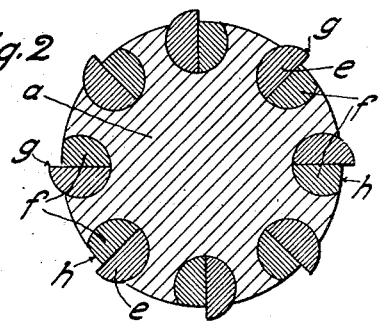

Figure 2 is a transverse section through the cutter head on the line A—B of Figure 1.

The milling cutter illustrated consists substantially of the cylindrical main body *a* and the conical carrier stem *b*, which can be fitted into a corresponding socket or bore in the working spindle. An additional means of attachment is provided by an internally screwed bore *c*. In the exterior of the main body *a* are formed in an axial direction cylindrical grooves of such a depth, that say about one third of the circumference of the completing circle projects from the external surface of the main body. Into each of these cylindrical grooves, the edges of which form confining lips, is fitted a half round cutting tool *e* and a half round holding pin *f* rounded off as shown at *h*, so as to present the cutting edge *g* of the tool *e*. The flats of the cutting tool *e* and the holding pin *f* bear against each other, and have a slight mutual taper, so as to provide a rigid chucking of the tool. The chucking is of such a nature that even under the greatest working and feeding movement the tool never twists out of position.

By slackening the wedge pieces *f* cutting tools *e* can be adjusted to different cutting angles to suit the material to be operated upon.

The cutting tools and the holding pins are not necessarily half round. For example, the tool and the holding pin may together form a regular polygon, (having for example, 6, 8 or 10 sides), the grooves, of course, being adapted to suit and the different angular positions of the tools can then be also conveniently obtained.

What I claim is:—

1. A milling cutter comprising a body having circular longitudinal grooves opening to the external surface of the body, said grooves being positioned in said body member within the outer periphery thereof, semi-circular cutters to partially fit the grooves and to project beyond the body, and semi-circular friction members driven in the direction of the longitudinal axes of the grooves to engage the cutters and frictionally hold the latter in any rotatably or longitudinally adjusted position.

2. A milling cutter comprising a body having circular longitudinal grooves opening to the external surface of the body, said grooves being positioned in said body member within the outer periphery thereof, semi-circular cutters to partially fit the grooves and to project beyond the body and semi-circular friction members driven in the direction of the longitudinal axes of the grooves to engage the cutters and frictionally hold the latter in any adjusted position, said friction members and cutters having co-operating flat wedging faces.

3. In a milling cutter, a body member having openings of partially circular cross-section extending longitudinally thereof and opening through one end of said body, tapered cutters of semi-circular cross-section longitudinally disposed in said openings and extending from the open ends thereof and having cutting edges on their ends longitudinally spaced from the body member, tapered wedges of semi-circular cross-section in said openings and extending longitudinally thereof and adapted to be driven in the direction of the longitudinal axes of the openings to bind the cutters in said openings in any rotatably or longitudinally adjusted position.

4. In a milling cutter, the combination comprising an elongated body member, a plurality of parallel partially cylindrical grooves in the elongated surface of said body member, the centers of said grooves being positioned within the outer periphery of said member, a substantially semi-cylindrical cutter adapted to occupy part of said groove and to project therefrom to present an external cutting edge, said cutter being held in place solely by means of a complementary wedge adapted to be driven in the direction of the longitudinal axis of said groove.

5. In a milling cutter, the combination comprising an elongated body member, a plurality of parallel partially cylindrical grooves in the elongated surface of said body member, the centers of said grooves being positioned within the outer periphery of said member, elongated semi-cylindrical cutters adapted to partially fill said groove and to project from said body presenting an external cutting edge and wedge members having semi-cylindrical transverse cross section adapted to be driven in the direction of the longitudinal axes of the grooves to engage the cutters and hold the same in any longitudinal and rotatably adjusted position.

6. In a cutting tool, the combination comprising an elongated body member, a plurality of partially cylindrical grooves in said body member, said grooves being open at both ends and positioned equidistantly around the outer periphery of said body member, semi-cylindrical cutters in said grooves, wedge members having semi-cylindrical transverse cross section adapted to be driven in the direction of the longitudinal axes of said grooves to engage the cutters and hold the same in any longitudinal and rotatably adjusted position, said cutters and wedge members having substantially flat coacting surfaces.

7. In a cutting tool, the combination comprising an elongated body member, a plurality of parallel partially cylindrical grooves in the elongated surface of said body member, the centers of said grooves being positioned within the outer periphery of said member, elongated cutters, each having a cross-section which is partially cylindrical, wedge members partially cylindrical in cross-section, said cutters and wedge members being complementary to each other to fill said grooves, said cutters and complementary wedge members adapted to be driven in the direction of the longitudinal axes of the grooves to secure the said cutters therein, the cutters being adapted to project from the end surface of said body member.

8. In combination, a solid rotary head having a series of cylindrical slots arranged about the axis thereof, said slots being positioned in said body member within the outer periphery thereof, cutters each having a flat face and a semi-cylindrical back each fitting a slot, and cooperating wedge members each having a flat face and a semi-cylindrical back, said cutters and wedges substantially filling the slots when the wedges are driven in the direction of the longitudinal axes of said slots against the cutters, whereby the cutters are adjustably held in any longitudinal or rotary position.

ALFRED BUCHMÜLLER.